(12) United States Patent
Murata et al.

(10) Patent No.: US 10,300,529 B2
(45) Date of Patent: May 28, 2019

(54) MOLD CLAMPING APPARATUS

(71) Applicant: NISSEI PLASTIC INDUSTRIAL CO., LTD., Hanishina-gun, Nagano (JP)

(72) Inventors: Atsushi Murata, Nagano (JP); Daiki Tanemura, Nagano (JP); Hiroo Okubo, Nagano (JP)

(73) Assignee: NISSEI PLASTIC INDUSTRIAL CO., LTD. (JP)

( * ) Notice: Subject to any disclaimer, the term of this patent is extended or adjusted under 35 U.S.C. 154(b) by 157 days.

(21) Appl. No.: 15/621,153

(22) Filed: Jun. 13, 2017

(65) Prior Publication Data

US 2018/0001378 A1    Jan. 4, 2018

(30) Foreign Application Priority Data

Jun. 29, 2016 (JP) ................................ 2016-128364

(51) Int. Cl.
| | | |
|---|---|---|
| *B29C 45/17* | (2006.01) | |
| *B29C 45/67* | (2006.01) | |
| *B22D 17/26* | (2006.01) | |
| *B29C 45/82* | (2006.01) | |

(52) U.S. Cl.
CPC .............. *B22D 17/26* (2013.01); *B29C 45/67* (2013.01); *B29C 45/82* (2013.01); *B29C 45/1761* (2013.01); *B29C 45/6707* (2013.01)

(58) Field of Classification Search
CPC ............ B29C 45/1761; B29C 45/6707; B29C 45/6728; B22D 17/266
See application file for complete search history.

(56) References Cited

U.S. PATENT DOCUMENTS

| 5,863,474 A * | 1/1999 | Ito ...................... B29C 45/1751 264/328.1 |
| 6,655,949 B2 * | 12/2003 | Chikazawa ......... B29C 45/1751 425/190 |
| 9,738,021 B2 * | 8/2017 | Yoda ................... B29C 45/1761 |
| 2005/0170037 A1 * | 8/2005 | Koike ................. B29C 45/6728 425/595 |

FOREIGN PATENT DOCUMENTS

JP    3881764    2/2007

\* cited by examiner

*Primary Examiner* — James P Mackey
(74) *Attorney, Agent, or Firm* — Adams & Wilks

(57) ABSTRACT

A mold clamping apparatus of the type including a mold opening/closing actuator and a mold clamping cylinder, wherein rails for guiding a movable platen are disposed on a base, and the mold clamping cylinder has a left leg and a right leg each disposed between one pair of left and right rails of the rails. The rails provided for guiding the movable platen is used also as a side guide for the mold clamping cylinder. This arrangement can obviate the need for a separate guide member.

4 Claims, 8 Drawing Sheets

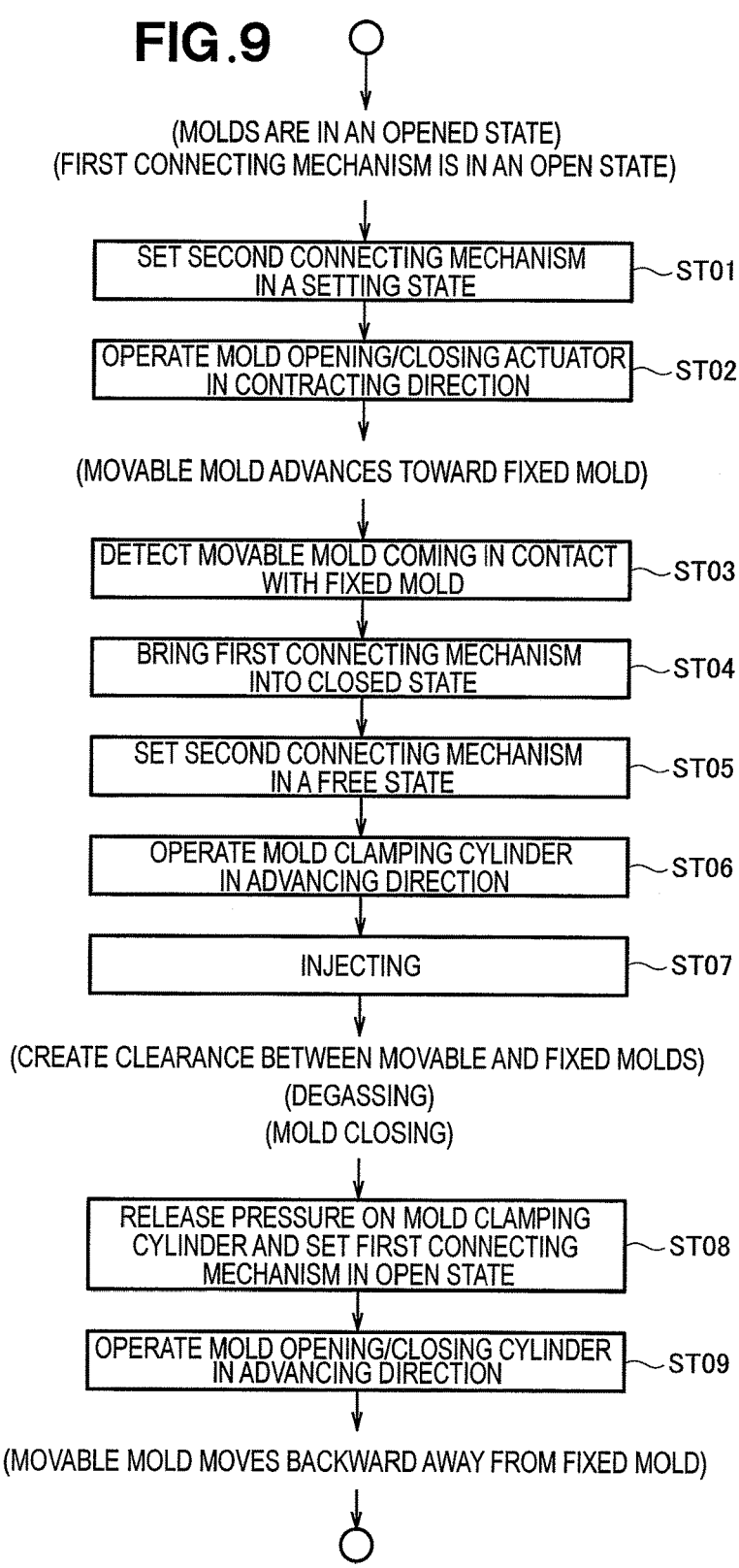

MOLD CLAMPING APPARATUS

FIELD OF THE INVENTION

The present invention relates to a mold clamping apparatus suitable for use in a horizontal injection molding machine.

BACKGROUND OF THE INVENTION

Horizontal injection molding machines mainly comprise a mold clamping apparatus for clamping a mold, and an injecting apparatus for injecting a resin material into the mold while the mold is clamped. In general, the mold clamping apparatus includes a fixed platen for supporting a fixed mold, a mold clamping cylinder disposed parallel to the fixed platen, tie bars extending between the mold clamping cylinder and the fixed platen, and a movable platen slidably guided by the tie bars and moved by the mold clamping cylinder, the movable platen supporting thereon a movable mold.

The clamping cylinder is configured to perform a movable mold displacing operation and a mold clamping operation in sequence. In recent years, however, in order to reduce the processing time and increase the productivity, improved arrangements have been proposed wherein the mold clamping cylinder performs only the mold clamping operation and another mold opening/closing actuator is provided for performing the movable mold displacement operation. One example of such improved arrangements is shown in Japanese Patent (JP-B) No. 3881764.

As shown in FIG. 1 of JP 3881764 B, a fixed platen (5) is fixed on a frame (1), a mold clamping cylinder (23) is disposed parallel to the fixed platen (5), tie bars (27, 27) extend between the mold clamping cylinder (23) and the fixed platen (5), and a movable platen (9) is arranged to be guided by the tie bars (27, 27). Note that reference signs in parentheses are those reference signs used in JP 3881764 B.

The movable platen (9) and the fixed platen (5) are connected by a mold opening/closing cylinder (17) such that the movable platen (9) is horizontally movable by the mold opening/closing cylinder (17). The mold clamping cylinder (23) is fixed a proper position on the tie bars (27) by means of half nuts (29).

The fixed mold (3) disposed on the fixed platen (5) and the movable mold (7) disposed on the movable platen (9) are mated together to form an injection space (mold cavity), and a molten resin material is injected into the injection space. After the injected resin material solidified, the mold opening/closing cylinder (17) is operated to move the movable platen (9) in a mold opening direction. Then, a molded article is removed from the mold and, thereafter, the mold opening/closing cylinder (17) is operated again to move the movable platen (9) in a mold closing direction until the movable mold (17) comes into contact with the fixed mold (3). Subsequently, the mold clamping cylinder (23) is operated to perform a mold clamping operation in preparation for injection of a molten resin material.

The frame (1) has a sliding plate (41) bonded thereto, and a base (45) is horizontally movably mounted on the sliding plate (41). The mold clamping cylinder (23) is fixed to the base (45). The mold clamping cylinder (23) and the movable platen (9) are mechanically connected together via a piston rod (26). With this arrangement, when the mold opening/closing cylinder (17) operates to move the movable platen (9), the base (45) moves on and along the sliding plate (41) in synchronism with movement with the movable platen (9). The sliding plate (41) is sufficiently long.

The base (45) has a relatively short sliding plate (43) bonded thereto, and the movable platen (9) is horizontally movably mounted on the sliding plate (43). The movable platen (9) is mounted on the base (45) which is largely movable and, therefore, the movable platen (9) moves relative to the sliding plate (43) over a short moving distance. This arrangement allows the sliding plate (43) to have a relatively small length.

A lubricating oil is applied to sliding portions formed between the sliding plate (41) and the base (45) and also between the sliding plate (43) and the movable platen (9) so that lubricity of the sliding portions is maintained. Since the base (45) moves on the sliding plate (41) over a relatively long distance, the lubricating oil is spread over the entire area of the sliding portion.

On the other hand, because the movable platen (9) moves on the sliding plate (43) over a relatively short distance, the lubricating oil is not spread sufficiently over the sliding portion and forms a part applied with the lubricating oil and another part devoid of the lubricating oil. As a consequence, lubricity of the sliding portion is deteriorated and seizure tends to occur. An arrangement, which is capable of increasing lubrication performance between the movable platen and the sliding plate, is therefore desired.

Although in JP 3881764B a related part of the description is omitted, the mold clamping apparatus shown in in JP 3881764 B requires a guide member provided to prevent displacement of the base (45) in a width direction of the frame (1) while the base (45) is moving on the sliding plate (41). Since the base (45) is movable over a relatively long distance, the guide member should be correspondingly long in length. The long guide member necessarily involves an increase in cost of the mold clamping apparatus. It is therefore desirable that the base (mold clamping cylinder) can be stably guided without requiring a separate guide member.

SUMMARY OF THE INVENTION

It is therefore an object of the present invention to provide a mold clamping apparatus having a mold opening and closing cylinder and a mold clamping cylinder, which has a structural feature capable of increasing lubricating performance between a movable platen and a sliding plate and also guiding the mold clamping cylinder without requiring a separate guide member.

According to the present invention, there is provided a mold clamping apparatus comprising: a base; a fixed platen fixedly mounted on the base and supporting a fixed mold; a mold clamping cylinder disposed parallel to the fixed platen and horizontally movably supported on the base, the mold clamping cylinder having a piston rod extending toward the fixed mold; a movable platen disposed between the fixed platen and the mold clamping cylinder and connected to the piston rod in such a manner as to be horizontally movably supported, the movable platen supporting a movable mold; tie bars extending horizontally from the fixed platen and penetrating the movable platen and the mold clamping cylinder; a first connecting mechanism arbitrarily connecting the mold clamping cylinder to the tie bars; a second connecting mechanism that connects the mold clamping cylinder and the movable platen; a mold opening/closing actuator that connects the fixed platen or the base and the movable platen; and rails laid on the base and horizontally movably supporting the movable platen, wherein the rails comprise a long-length member that supports the movable platen and serves as a side guide for the mold clamping cylinder.

With this arrangement, the mold clamping cylinder and the movable platen are moved by the mold opening/closing actuator. The movable platen moves largely in a like manner as the mold clamping cylinder so that lubricating performance between the movable platen and the rails can be improved. Furthermore, the rails provided for the movable platen serve also as a guide for the mold clamping cylinder. It will be readily appreciated that the mold clamping apparatus according to the present invention includes a mold opening/closing actuator and a mold clamping cylinder and further has a structural feature which is capable of increasing lubricating performance between the movable platen and the rails and guiding the mold clamping cylinder without requiring a separate guide member.

Preferably, the mold clamping cylinder is supported on the base in a sliding contact state, and the movable platen is supported on the rails in a rolling contact state. In a certain type of injection molding operation, after a molten resin material is injected into the mold while the mold is clamped, the mold is slightly opened by a filling pressure to thereby discharge gas entrained in the resin material. In this instance, if the movable platen is supported on the rails in a rolling contact state as in the present invention, the movable platen can readily and smoothly move into a gas discharging operation.

The mold clamping cylinder has a large-diameter piston rod so as to generate a sufficiently large mold clamping force and hence is heavy in weight. The mold opening/closing actuator operates to move and stop the mold clamping cylinder. The heavy mold clamping cylinder produces a large inertial force, making it difficult to perform stop control of the mold clamping cylinder. According to the present invention, the mold clamping cylinder is supported on the base in a sliding contact state which involves a 10 times or larger friction coefficient than the friction coefficient acting in the rolling contact state. This will ensure that a sufficiently large braking force acts on the mold clamping cylinder and the mold clamping cylinder can readily be stopped without requiring an advanced or high-tech stop control.

Preferably, the mold clamping cylinder and the movable platen are connected with a second connecting mechanism.

BRIEF DESCRIPTION OF THE DRAWINGS

Certain preferred embodiments of the present invention will be described in detail below, by way of example only, with reference to the accompanying drawings, in which:

FIG. 9 is a flowchart showing a sequence of operations of the mold clamping apparatus.

DETAILED DESCRIPTION OF THE PREFERRED EMBODIMENTS

Figure 1:
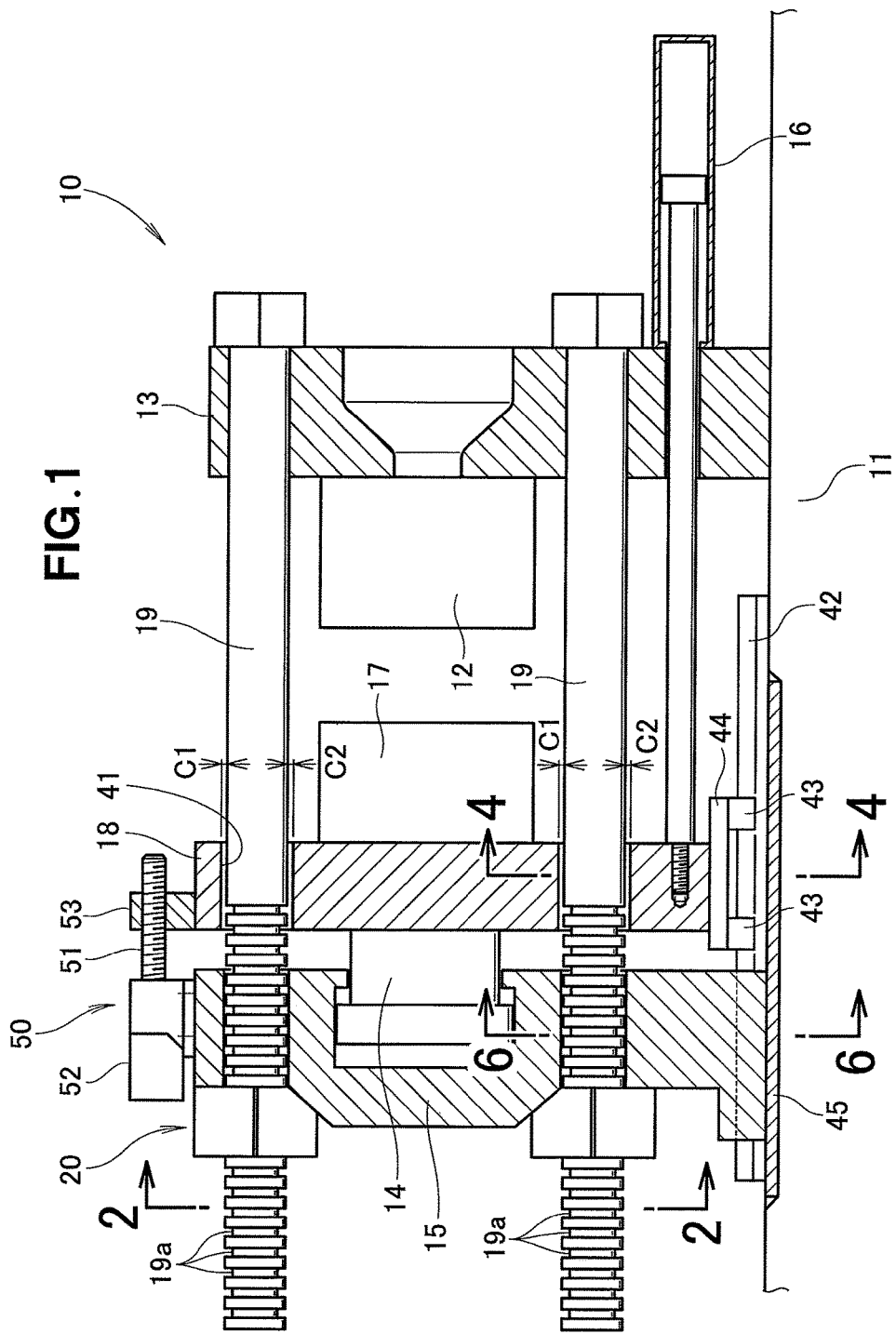
FIG. 1 is a side view of a mold clamping apparatus according to the present invention.

As shown in FIG. 1, a mold clamping apparatus 10 includes a base 11, a fixed platen 13 fixedly mounted on the base 11 and supporting a fixed mold 12, a mold clamping cylinder 15 disposed parallel to the fixed platen 13 and horizontally movably supported on the base 11, the mold clamping cylinder 15 having a piston rod 14 extending toward the fixed mold 12, a mold opening/closing actuator 16 for moving the mold clamping cylinder 15 and a movable platen 18, the movable platen 18 being disposed between the fixed platen 13 and the mold clamping cylinder 15 and connected to the piston rod 14 in such a manner as to be horizontally movably supported on the base 11, the movable platen 18 supporting a movable mold 17, tie bars 19, 19 extending horizontally from the fixed platen 13 and penetrating the movable platen 18 and the mold clamping cylinder 15, a first connecting mechanism 20 arbitrarily connecting the mold clamping cylinder 15 to the tie bars 19, and a second connecting mechanism 50 mechanically connecting the mold clamping cylinder 15 and the movable platen 15.

The mold opening/closing actuator 16 in the illustrated embodiment is a hydraulic cylinder which interconnects the fixed platen 13 and the movable platen 18. Rails 42 are laid on the base 11, and sliders 43 are movably mounted on the rails 42. A bridge 44 is fixed on the sliders 43, and the movable platen 18 is fixed on the bridge 44. A sliding plate 45 is provided on an upper surface of the base 11, and a bottom surface of the mold clamping cylinder 15 is in contact with the sliding plate 45.

The movable platen 18 has a plurality of through-holes 41 having a diameter larger than a diameter of the tie bars 19 by an amount clearances C1, C2 defined between each respective through-hole 41 and a corresponding one of the tie bars 19. The tie bars 19 are therefore kept out of sliding contact with inner peripheral surfaces of the through-holes 41.

The second connecting mechanism 50 includes, for example, a ball screw 51 disposed parallel to the tie bars 19, a rotary actuator 52 for rotatably driving the ball screw 51, and a ball nut 53 threadedly engaged with the ball screw 51. In the illustrated embodiment, the rotary actuator 52 is mounted on the mold clamping cylinder 15 and the ball nut 53 is fixed to the movable platen 18. As an alternative, the rotary actuator 52 may be mounted on the movable platen 18 in which instance the ball nut 53 is fixed to the mold clamping cylinder 15. Due to the presence of rolling elements disposed between the ball screw 51 and the ball nut 53, a friction resistance and an internal clearance between the ball screw 51 and the ball nut 53 are very small.

Figure 2:
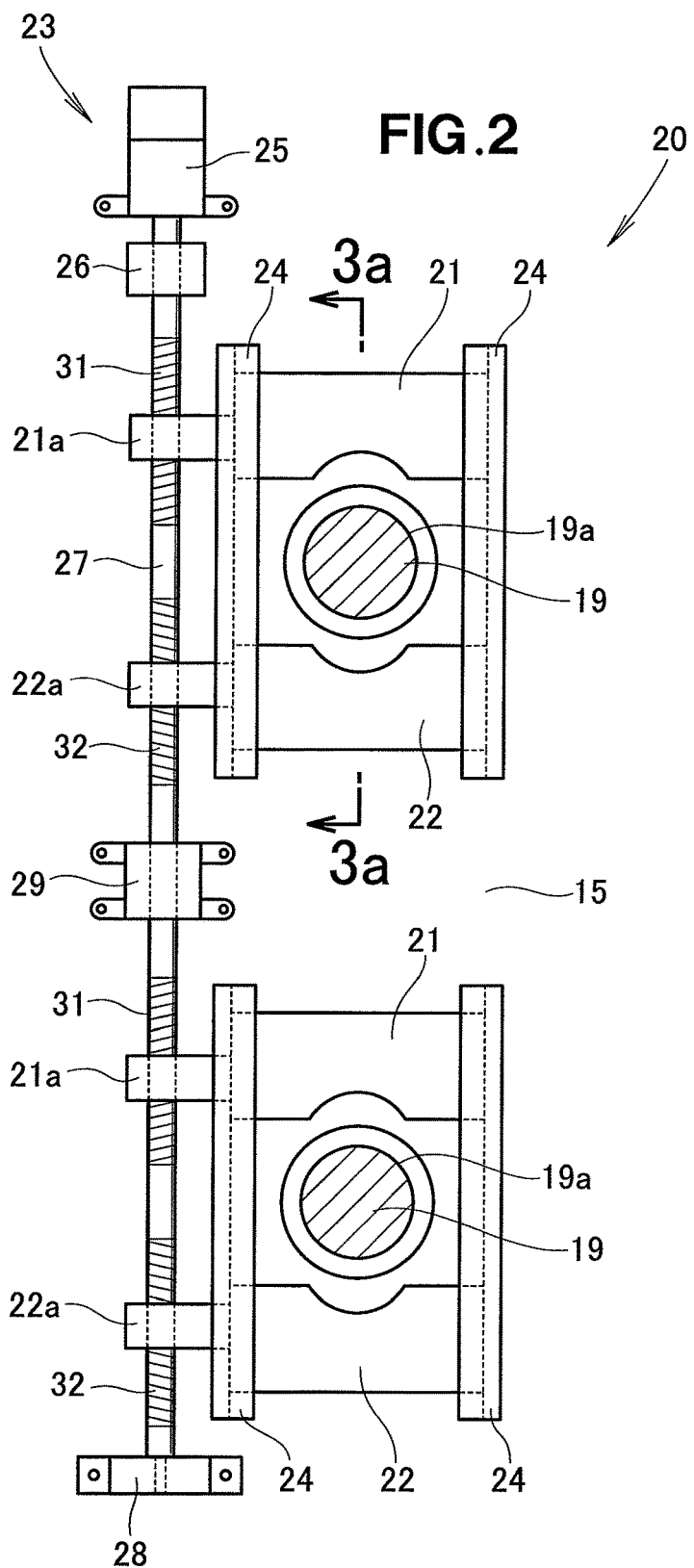
FIG. 2 is a view taken in a direction of arrows 2-2 of FIG. 1.

As shown in FIG. 2, the first connecting mechanism 20 includes circumferential grooves 19a formed on each of the tie bars 19, lock plates 21, 22 formed to be fitted with a selected one of the circumferential grooves 19a, and a lock plate moving actuator 23 for moving the lock plates 21, 22 in a direction perpendicular to an axis of the tie bar 19. The lock plates 21, 22 are guided by guides 24, 24 each having an L-shaped cross section so as to prevent movement of the lock plates 21, 22 in an axial direction of the tie bar 19.

The lock plate moving actuator 23 is constituted by a servo motor 25, and a screw shaft 27 driven by the servo motor 25 via a coupling 26. A lower end and an intermediate portion of the screw shaft 27 are supported by bearing stands 28, 29, respectively. The screw shaft 27 has right screws 31 and left screws 32 formed thereon. A nut 21*a* extending from the upper lock plate 21 is threadedly engaged with the right screw 31, and a nut 22*a* extending from the lower lock plate 22 is threadedly engaged with the left screw 32. When the screw shaft 27 is rotated in a forward direction, the upper and lower lock plates 21, 22 are synchronously moved closer to the circumferential grooves 19*a*. When the screw shaft 27 is rotated in a reverse direction, the upper and lower lock plates 21, 22 are synchronously moved away from the circumferential grooves 19*a*.

Figure 3A:
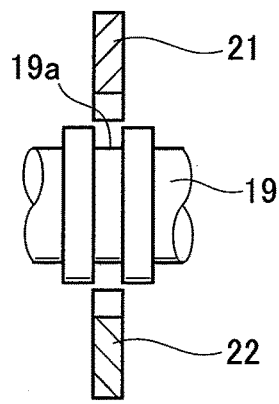
FIGS. 3A and 3B are cross-sectional views taken along line 3a-3a of FIG. 2, showing an operation of the mold clamping apparatus.
Figure 3B:
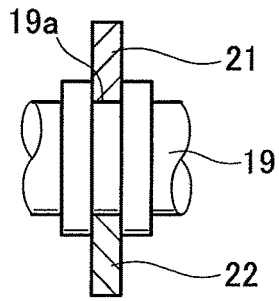

The upper and lower lock plates 21, 22 shown in FIG. 3A are moved closer to a selected one of the circumferential grooves 19*a*, and fitted with the selected one of the circumferential grooves 19*a* as shown in FIG. 3B. In this state, the mold clamping cylinder 15 shown in FIG. 1 is integrated with the tie bars 19. Conversely, in FIG. 3A, the mold clamping cylinder 15 shown in FIG. 1 is movable separately from the tie bars 19.

Figure 4:
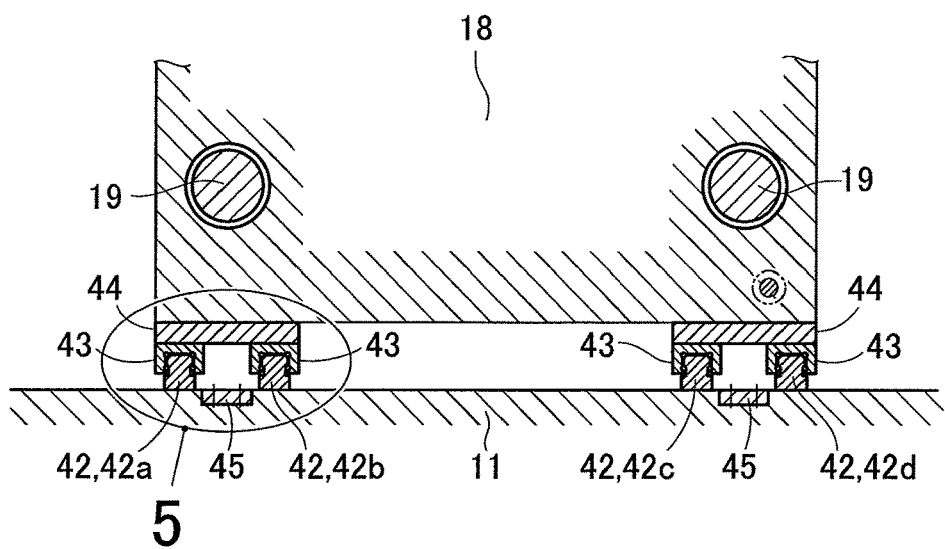
FIG. 4 is a cross-sectional view taken along line 4-4 of FIG. 1.

As shown in FIG. 4, the rails 42 disposed on the base 11 comprises four rails 42*a*, 42*b*, 42*c*, 42*d*, and the sliders 43 each comprise a saddle-shaped slider mounted on one of the rails 42. The bridge 44 is fixed on a pair of left and right sliders 43, 43. The movable platen 18 is mounted on a pair of left and right bridges 44 and fixed to the bridges 44.

Figure 5:
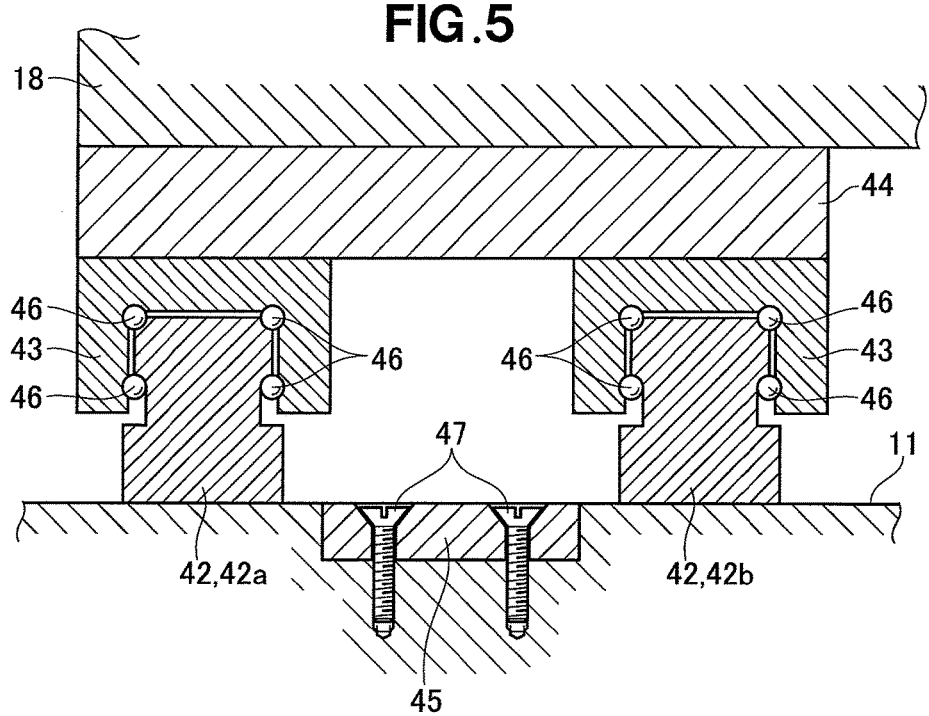
FIG. 5 is an enlarged view of a portion designated by 5 in FIG. 4.

As shown in FIG. 5, rolling elements 46 are interposed between each rail 42 and the corresponding slider 43. Rolling elements 46 are preferably formed by steel balls or rollers. A form of contact in which two steel members are in direct contact with each other is called as "sliding contact". Another form of contact in which the rolling elements 46 are interposed between two steel members is called as "rolling contact". It is known that the sliding contact involves a friction coefficient in the range of about 0.1 to about 0.2 whereas the rolling contact involves a friction coefficient in the range of about 0.001 to about 0.01.

The sliding plate 45 provided on the upper surface of the base 11 is disposed between the left and right rails 42*a*, 42*b*. The sliding plate 45 is preferably formed by a flat plate having a hardness greater than the base 11. The sliding plate 45 is attached to the base 11 by screws 47.

Figure 6:
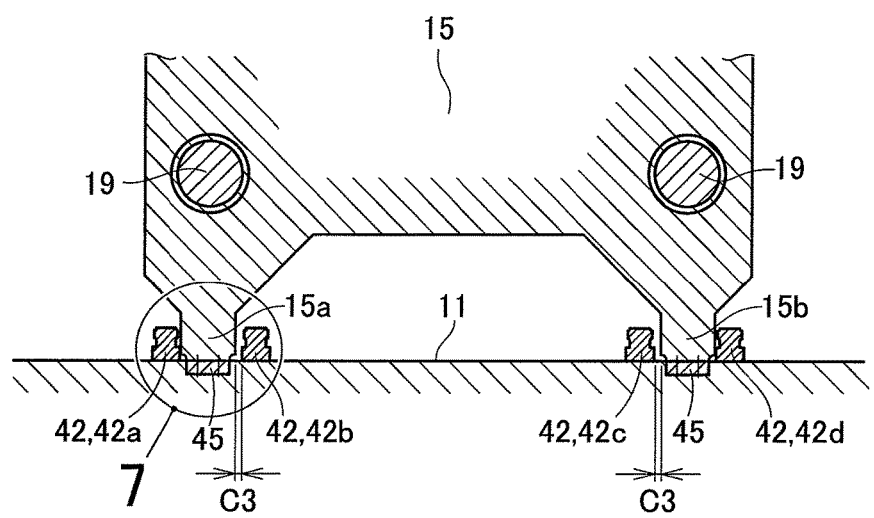
FIG. 6 is a cross-sectional view taken along line 6-6 of FIG. 1.
Figure 7:
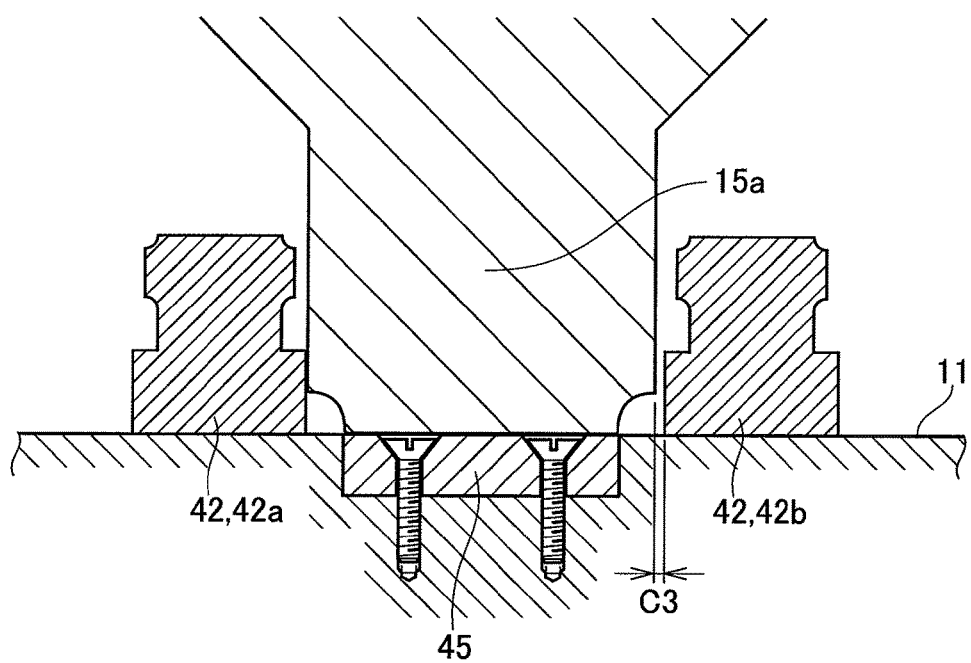
FIG. 7 is an enlarged view of a portion designated by 7 in FIG. 6.

As shown in FIG. 6, a bottom part of the mold clamping cylinder 15 includes a pair of left and right legs 15*a*, 15*b* directly placed on the sliding plates 45, 45. The legs 15*a*, 15*b* and the sliding plate 45 are in a sliding contact state which involves a large friction coefficient. As shown in FIG. 7, the left leg 15*a* has an outer side surface held in contact with a side surface of the left rail 42*a*, and an inner side surface of the left leg 15*a* is separated from a side surface of the right rail 42*b* by a clearance C3. The clearance C3 is set to be about 0.1 to about 0.4 mm.

In FIG. 6, each of the left and right legs 15*a*, 15*b* is in contact with one rail 42*a*, 42*d* on a lateral outer side of the pair of left and right rails 42*a*, 42*b*; 42*c*, 42*d* while keeping the clearance C3 between itself and the other rail 42*b*, 42*c* on a lateral inner side of the pair of left and right rails 42*a*, 42*b*; 42*c*,42*d*. It may occur that one of the rails 42*a*, 42*b* undergoes slight deformation due to a temperature change or a secular change. Similarly, one of the rails 42*c*, 42*d* may undergo slight deformation. In such instance, the deformation can be taken up by the clearance C3. The clearance C thus provided insures smooth movement of the legs 15*a*, 15*b*.

In an adjustment stage of the mold clamping apparatus, a contact between the mold clamping cylinder 15 and the rails 42*a*, 42*d* is checked while the mold clamping cylinder 15 is reciprocally moved. The rails 42*a*, 42*d* are adjusted in position until a desired degree of contact is obtained. The outer rails 42*a*, 42*d* are advantageous over the inner rails 42*b*, 42*c* as they are easy to access and maintain as compared to the inner rails 42*b*, 42*c*.

Figure 8A:
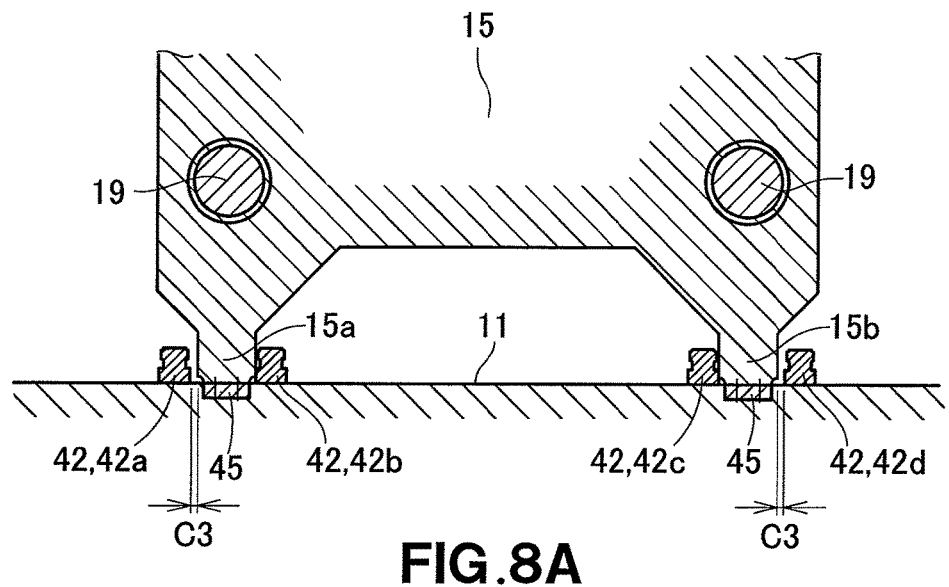
FIGS. 8A and 8B are views showing different forms of a side guide according to modifications of the present invention.
Figure 8B:
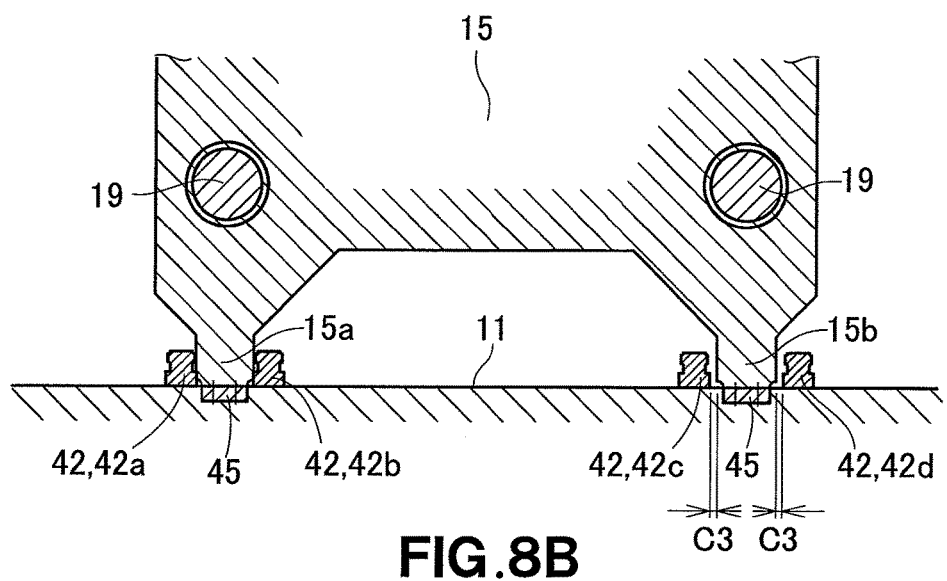

As an alternative, the legs 15*a*, 15*b* may be arranged to be in contact with the inner rails 42*b*, 42*c* while keeping a clearance C3 between each of the legs 15*a*, 15*b* and a corresponding one of the outer rails 42*a*, 42*d*, as shown in FIG. 8A. In another alternative form of the invention shown in FIG. 8B, the leg 15*a* may be held in in contact with both of the inner and outer rails 42*a*, 42*b*, and the leg 15*b* is separated from both of the inner and outer rails 42*c*, 42*d* by clearances C3, C3.

In the arrangement shown in FIGS. 6, 7, 8A and 8B, the rails 42 provided for guiding the movable platen 18 is used also as a side guide for the mold clamping cylinder 15. It will be readily appreciated that an arrangement, which is capable of guiding the mold clamping cylinder 15 without requiring a separate guide member (such as a separate guide rail), can be provided according to the invention.

An operation of the mold clamping apparatus 10 of the foregoing configuration will be described with reference to FIG. 1. As shown in FIG. 9, the operation begins from a condition in which the molds 12, 17 are opened and the first connecting mechanism 20 is in an open state shown in FIG. 3A. Firstly, the second connecting mechanism 50 is set in a setting state (ST01) where a distance between the mold clamping cylinder 15 and the movable platen 18 is set to a predetermined value by the second connecting mechanism 50, as shown in FIG. 1. The mold opening/closing actuator 16 is then operated in a contracting direction (ST02). The base 44, the mold clamping cylinder 15, the movable platen 18, and the movable mold 17 shown in FIG. 1 are moved in unison toward the fixed platen 13.

Next, a step ST03 detects that the movable mold 17 comes in contact with the fixed mold 13. To enable the detection, various switching positions of the mold opening/closing actuator 16 are detected in advance by a linear encoder (not shown), for example, and stored in a memory (not shown) while opening and closing the movable mold 17 when the molds are replaced. Based on detection information, the first connecting mechanism 20 is brought into a closed state shown in FIG. 3B (ST04).

Figure 10A:
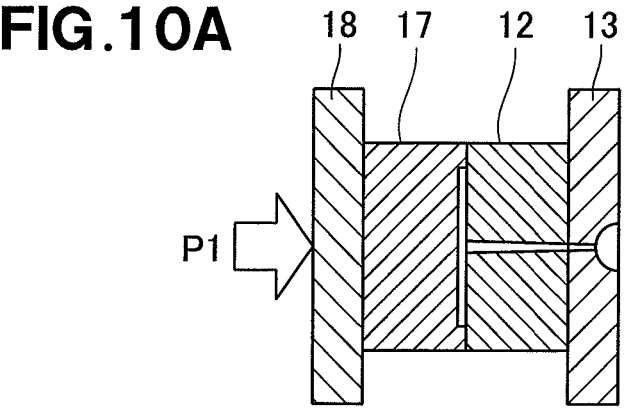
FIGS. 10A to 10C are views showing a venting or degassing operation of the mold clamping apparatus.

A role assigned to the second connecting mechanism 50 has completed, the second connecting mechanism 50 is set in a free state (ST05). Then, the mold clamping cylinder 15 is operated in an advancing direction (ST06) to thereby clamp the movable mold 17 relative to the fixed mold 12. In this instance, a mold clamping force acting on the movable mold is denoted by P1 shown in FIG. 10A.

Figure 10B:
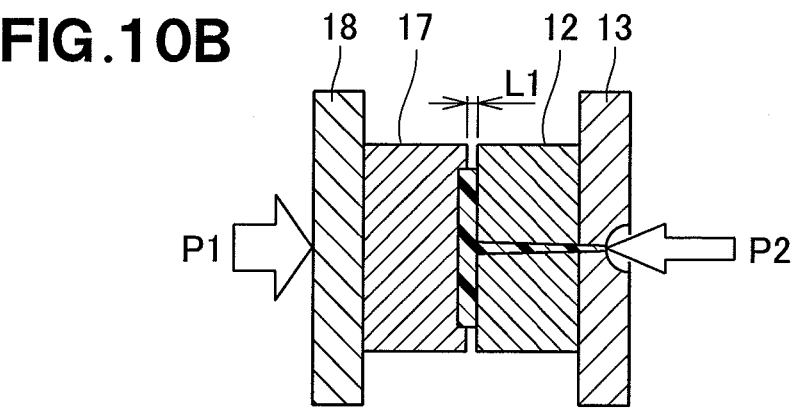
Figure 10C:
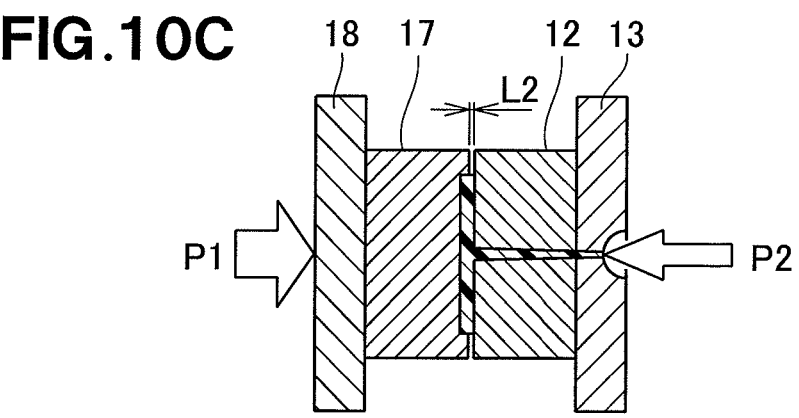

In response to information indicative of completion of a mold clamping operation, an injecting operation is performed (ST07). The movable mold 17 is slightly displaced in a mold opening direction to open the molds 12, 17, thereby venting the gas in the mold cavity, and then the movable mold 17 slightly moves back in a mold closing direction as shown in FIG. 10B, 10C. The slight movement of the movable mold 17 in the mold opening and closing directions is achieved smoothly because the movable platen 15 is kept out of sliding contact with the tie bars 19 as shown in FIG. 1, and the sliders 43 held in a rolling contact state can move very smoothly.

When the injected resin material becomes solidified, the mold clamping force or pressure P1 is released and the first connecting mechanism 20 is placed in the open state (ST08). Then, the mold opening/closing actuator 16 is operated in an advancing direction (ST09) to thereby displace the movable mold 17 in the mold opening direction until the movable mold 17 arrives at the position shown in FIG. 1.

In the illustrated embodiment, the mold opening/closing actuator 16 employs a moving cylinder such as a hydraulic cylinder or an air cylinder because the moving cylinder is relatively inexpensive and, hence, the mold opening/closing actuator 16 can be manufactured at a relatively low cost. The illustrated embodiment should be construed as not restrictive, and the mold opening/closing actuator 16 may be formed by an electric cylinder. Further, the mold opening/closing actuator 16 may be connected to the mold clamping cylinder 15 instead of the movable platen 18.

In the embodiment shown in FIG. 1, the rails 42 and the sliders 43 are in a rolling contact state, and the sliding plates 45 and the mold clamping cylinder 15 are in a sliding contact state. For comparative purposes, a consideration will be given to an arrangement in which the rails 42 and the sliders 43 are in a rolling contact state and the sliding plates 45 and the mold clamping cylinder 15 are also in a rolling contact state. All the members in the arrangement that are adapted to perform a relative movement are, therefore, in a rolling contact state.

As previously described, a friction coefficient involved in the rolling contact is remarkably smaller than a friction coefficient involved in the sliding contact. When the mold opening/closing actuator 16 is operated to stop movement of the mold clamping cylinder 15, a great inertial force acts on the mold clamping cylinder 15. In the case where the mold opening/closing cylinder 16 is comprised of a relatively inexpensive hydraulic cylinder, it becomes difficult to stop the mold clamping cylinder 15 at a prescribed position. In order to increase the positional accuracy, a special hydraulic circuit is required. As an alternative, if an electric cylinder having a built-in ball screw mechanism is employed as the mold opening/closing actuator, the ball screw mechanism will be subjected to a load and hence requires an increase in the size of the electric cylinder. However, the special hydraulic circuit or the size increase of the electric motor brings about an undesired cost increase of the mold clamping apparatus.

Consideration will be next given to an arrangement in which the rails 42 and the sliders 43 are in a sliding contact state, and the sliding plats 45 and the mold clamping cylinder 15 are also in a sliding contact state. All the members in the arrangement that are adapted to perform a relative movement are, therefore, in a sliding contact state. As previously described, the friction coefficient involved in the sliding contact is remarkably larger than the friction coefficient involved in the rolling contact. An attempt to displace the movable platen 18 by using an injection pressure (filling pressure) in the step ST07 shown in FIG. 9 will encounter a large friction resistance acting between the rails 42 and the sliders 43. The movable platen 18 is hindered from moving smoothly and a desired venting or degassing operation cannot be performed.

The foregoing problems do not take place in the illustrated embodiment of the present invention because the sliding plates 45 and the mold clamping cylinder 15 are in a sliding contact state while the rails 42 and the sliders 43 are in a rolling contact state. By virtue of a large friction coefficient involved in the sliding contact formed between the sliding plates 45 and the mold clamping cylinder 15, the mold clamping cylinder 15 can be stopped with increased accuracy. On the other hand, a rolling contact formed between the rails 42 and the sliders 43 allows the movable platen 18 to be displaced by a small force or pressure. This will ensure that the movable platen 18 can be smoothly displaced by using an injection pressure and a desired venting or degassing operation can be performed smoothly and reliably.

The bridges 44 shown in FIG. 4 can be omitted in which instance the sliders 43 are directly attached to the bottom surface of the movable platen 18. Furthermore, the sliders 43 shown in FIG. 5 may be integrally formed with the movable platen 18 in which instance the bottom surface of the movable platen 18 is apparently directly mounted on the rails 42.

In the illustrated embodiment, the base 11 has grooves formed on its upper surface, and the sliding plates 45 are embedded in the grooves. With this arrangement, the upper surfaces of the respective sliding plates 45 can be set on the same plane as the upper surface of the base 11. The slide plates 45 may be simply placed on and fixed to the upper surface of the base 11 without forming grooves in the base 11. When employing the sliding plates 45, a way of attaching the sliding plates 45 relative to the base 11 is optional.

The sliding plate 45 shown in FIG. 7 may be omitted in which instance the bottom surface of the leg 15a is directly supported on the upper surface of the base 11. It is recommended, however, that the sliding plate 45 having a higher abrasion resistance than the base 11 is attached to the upper surface of the base 11.

Furthermore, the inner rails 42b, 42c shown in FIG. 4 may be omitted in which instance the movable platen 18 is supported on a pair of left and right rails 42a, 42d. The number of rails 42 should by no means be limited to four as in the illustrated embodiment.

Obviously, various minor changes and modifications of the present invention are possible in light of the above teaching. It is therefore to be understood that within the scope of the appended claims the invention may be practiced otherwise than as specifically described.

What is claimed is:
1. A mold clamping apparatus comprising:
 a base;
 a fixed platen fixedly mounted on the base and supporting a fixed mold;
 a mold clamping cylinder disposed parallel to the fixed platen and horizontally movably supported on the base, the mold clamping cylinder having a piston rod extending toward the fixed mold;
 a movable platen disposed between the fixed platen and the mold clamping cylinder and connected to the piston rod in such a manner as to be horizontally movably supported, the movable platen supporting a movable mold;
 tie bars extending horizontally from the fixed platen and penetrating the movable platen and the mold clamping cylinder;
 a first connecting mechanism arbitrarily connecting the mold clamping cylinder to the tie bars;
 a mold opening/closing actuator that connects the fixed platen or the base and the movable platen; and
 rails laid on the base and horizontally movably supporting the movable platen, wherein the rails comprise a long-length member that supports the movable platen and serves as a side guide for the mold clamping cylinder.

2. The mold clamping apparatus according to claim 1, wherein the mold clamping cylinder is supported on the base in a sliding contact state, and the movable platen is supported on the rails in a rolling contact state.

3. The mold clamping apparatus according to claim 2, wherein the mold clamping cylinder and the movable platen are connected with a second connecting mechanism.

4. The mold clamping apparatus according to claim 1, wherein the mold clamping cylinder and the movable platen are connected with a second connecting mechanism.

* * * * *